May 27, 1924.
R. T. PIERCE
THERMOCOUPLE
Filed March 23, 1921
1,495,795
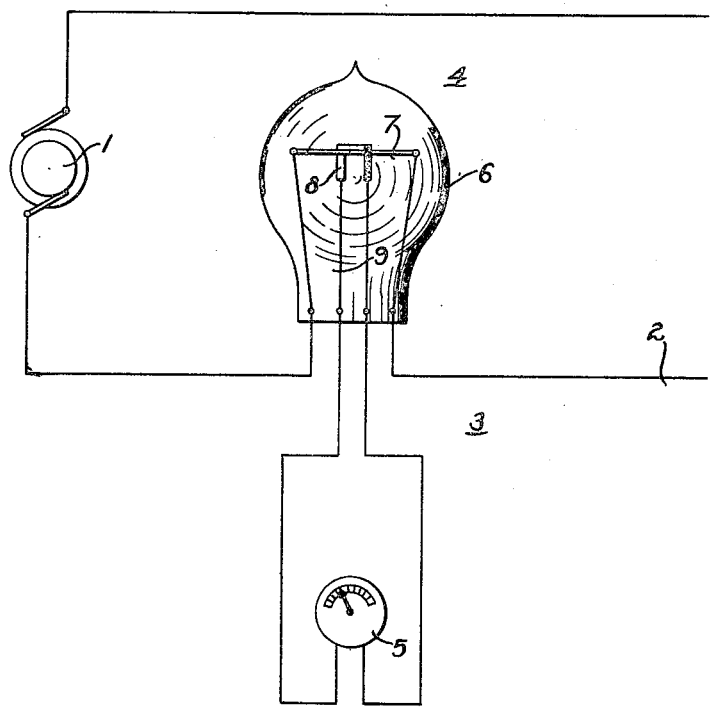
WITNESSES:
L. F. Sonnemann.
J. E. Foster
INVENTOR
Raymond T. Pierce.
BY
Wesley G. Carr,
ATTORNEY Patented May 27, 1924.

1,495,795

UNITED STATES PATENT OFFICE.

RAYMOND T. PIERCE, OF SWISSVALE STATION, PENNSYLVANIA, ASSIGNOR TO WESTINGHOUSE ELECTRIC & MANUFACTURING COMPANY, A CORPORATION OF PENNSYLVANIA.

THERMOCOUPLE.

Application filed March 23, 1921. Serial No. 454,960.

*To all whom it may concern:*

Be it known that I, RAYMOND T. PIERCE, a citizen of the United States, and a resident of Swissvale Station, in the county of Allegheny and State of Pennsylvania, have invented a new and useful Improvement in Thermocouples, of which the following is a specification.

My invention relates to measuring instruments and particularly to thermocouple bulbs for thermal instruments.

One object of my invention is to provide a thermocouple bulb for thermal measuring instruments in which the thermocouple shall embody elements having negligible temperature coefficients of resistance.

Another object of my invention is to provide a thermocouple for bulbs, of the above-indicated character, that shall obviate variations in meter readings heretofore caused by variations in the resistance of the thermocouples with changes in temperature.

In measuring an electrical quantity, such as the value of an electrical current, a simple form of millivoltmeter including a thermal cell or bulb is frequently used. Such a cell has heretofore comprised an evacuated sealed envelope containing a thermal or heating element mounted therein and having a thermocouple connected thereto. An indicating device or meter connected to the thermocouple of the cell and graduated for the quantity to be measured indicated directly the value of the quantity, such, for example, as the current traversing the heating element of the cell.

A serious commercial disadvantage of this type of measuring instrument has been that the resistance of the thermocouples employed with the heating elements varied when the value of current traversing the heated element varied to change the temperature thereof. The indication of the meter was not, therefore, a correct indication of the value of the electrical quantity being measured. Moreover, the bulbs could not be used interchangeably with indicating instruments of corresponding capacity.

In view of the above disadvantage, I provide a bulb comprising a filamentary heating element and a thermocouple subjected thereto embodying two elements, each of which has a negligible temperature-resistance coefficient. Thus, the change in temperature effected in the heater by variations in the value of the current traversing the same does not affect the accuracy of the measuring instruments.

The thermocouple that I employ embodies an element of manganin and an element known as advance or constantan. Manganin is an alloy of about 84% copper, 12% manganese, 4% nickel and a trace of iron, and advance is an alloy of substantially equal parts of copper and nickel with small percentages of manganese and iron. By employing connecting wires of corresponding material between the thermocouple elements and the external connections to the measuring instrument, variations in the resistance of such connecting wires are obviated.

The single figure of the accompanying drawing is a diagrammatic view of an electrical measuring instrument embodying my invention.

A source of electromotive force 1 is connected to an electrical circuit 2. A measuring instrument 3 is connected to the circuit 2 to measure the current traversing the same and comprises a thermocouple bulb 4 and an indicating instrument 5.

The bulb 4 comprises a sealed envelope 6 containing a filamentary heater 7 and a thermocouple 8 thermally associated therewith. The thermocouple 8 comprises an element of advance and an element of manganin, the outer terminals of which are connected through connecting leads 9 to the indicating instrument 5. The bulb 6 contains an inert gas, such as, for example, hydrogen.

Since the thermocouple 8 and the connecting leads 9 embody metals that have substantially no temperature coefficients of resistance, the resistance of the thermocouple and the connecting leads 9 does not vary with changes in the temperature of the heater element 7. Thus, all such bulbs that are manufactured for measuring instruments of the same capacity will not produce indications varying from each other for corresponding conditions.

My invention is not limited to the specific elements as illustrated nor to the arrangement that is illustrated, since the device may be used for measurements in various circuits and may be variously modified within the spirit and scope of my invention, as set forth in the appended claims.

I claim as my invention:—

1. A thermocouple comprising two elements, each having a negligible temperature coefficient of resistance.

2. A thermocouple comprising an element of advance and an element of manganin.

3. A thermocouple comprising an element formed of an alloy containing copper and manganese as its principal constituents, and an element formed of an alloy containing copper and nickel as its principal constituents.

4. In a thermocouple, the combination with an element formed of an alloy containing approximately 84% of copper, 12% of manganese, 4% of nickel and a small amount of iron, of an element formed of an alloy containing approximately equal parts of copper and nickel with small amounts of manganese and iron.

In testimony whereof, I have hereunto subscribed my name this 14th day of March, 1921.

RAYMOND T. PIERCE.